J. M. BASSLER.
REVOLVING HARROW.
APPLICATION FILED DEC. 12, 1913.
1,091,273.
Patented Mar. 24, 1914.
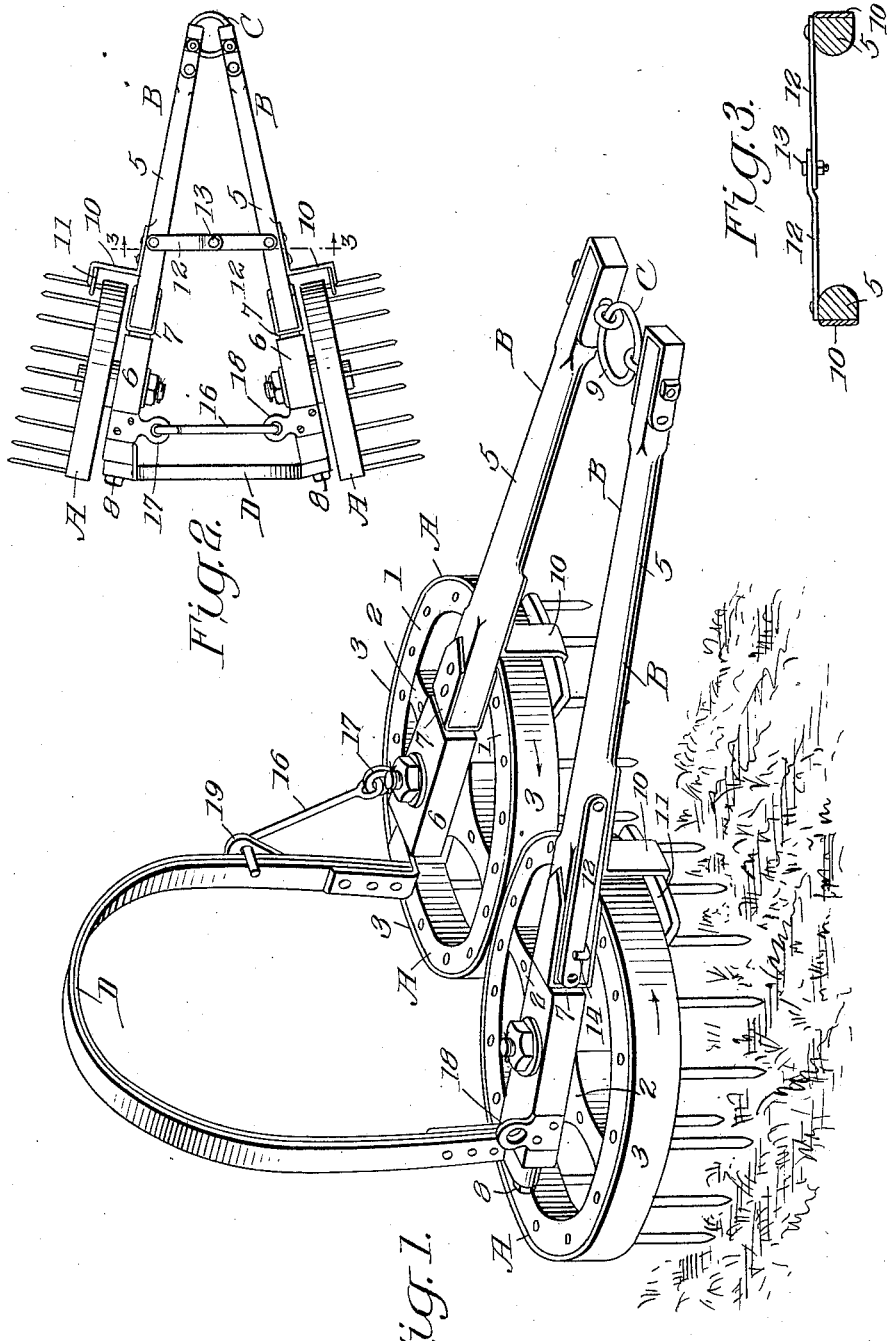
WITNESSES
B. E. Wade.
Wm. E. Beck.
INVENTOR
JOHN M. BASSLER,
BY Munn & Co.
ATTORNEYS

UNITED STATES PATENT OFFICE.

JOHN M. BASSLER, OF MARION, OHIO.

REVOLVING HARROW.

1,091,273.  Specification of Letters Patent.  Patented Mar. 24, 1914.

Application filed December 12, 1913. Serial No. 806,263.

*To all whom it may concern:*

Be it known that I, JOHN M. BASSLER, a citizen of the United States, and a resident of Marion, in the county of Marion and State of Ohio, have invented certain Improvements in Revolving Harrows, of which the following is a specification.

My invention consists in certain improvements which are embodied in two circular harrows arranged horizontally and mounted on axes having bearings in draft bars whose front ends are loosely connected by a draft appliance, their rear ends being coupled elastically by a bowed plate spring which serves to hold the peripheries of the harrows in frictional contact, so that the rotation of one aids rotation of the other, which operation enables the harrow teeth to clear themselves of adhering turf, vines, or other trash. The rear portions of the draft bars to which the harrows are pivoted are preferably swiveled to the front portions of said bars which enables the harrows to conform more easily to inequalities of the surface over which they are dragged. The invention is the same as that forming the subject of my prior allowed application, Serial No. 641,500, which became forfeited April 13, 1912 and abandoned Oct. 13, 1913.

In the accompanying drawing Figure 1 is a perspective view of my invention showing the same arranged as in use. Fig. 2 is a plan view showing it arranged for travel or transportation. Fig. 3 is a cross section on the line 3—3 of Fig. 2.

A, A, indicate two circular harrows, B, B, two draft bars connected at their front ends by a coupling C and at their rear ends by a bowed plate spring D which is arranged vertically. Each harrow is constructed of a wooden frame consisting of a circle 1, radial spokes 2, and an iron or steel band or rim 3 which encircles the part 1. Both portions 1 and 2 of the frame are provided with teeth of any suitable construction.

The draft bars B are preferably made in two parts, to wit, a front part 5 and a rear part or section 6, the two being connected at 7 by a swivel joint. Each harrow is pivoted centrally to a rear swiveled section 6, so that it is adapted to revolve horizontally or in any plane approximating the horizontal.

The spring D is constructed of a series of spring plates in a manner analogous to the construction of leaf springs of carriages, and the ends of the same are provided with eyes to receive headed bolts 8 which are inserted in the rear ends of the swiveled sections 6. The spring is under tension when the peripheries of the harrows A are in contact, as shown in Fig. 1, and holds them thus together with a considerable degree of pressure, so that they have a corresponding friction one with the other, and hence, when the harrow as a whole is dragged over the ground, each section A tends to rotate and each aids or tends to produce rotation of the other. By such rotation—whose direction is indicated by arrows—the teeth clear themselves readily from turf, grass, vines, etc. The form and arrangement of the spring D, it being bowed and projecting vertically, adapts it to serve as a convenient appliance for lifting or adjusting the harrows at the ends of a field, or changing them from working position to a vertical position, in which latter they travel on their peripheries, as shown in Fig. 2, the bands 3 then serving as tires. Such adjustment or change from the horizontal to the vertical is permitted by the swivel joints at 7, and the loose draft coupling C. In fact, the swiveled connection 7 may be dispensed with, if desired, since the front coupling C may serve to permit the change of position described. It is obvious that owing to such loose coupling, the harrows A will follow inequalities of the surface, or, in other words, adjust themselves transversely to different inclinations of the surface and thus operate, although it may be at a greater or less angle to each other. In practice, the team is attached to the ring 9 of the front coupling C.

I provide a guard or stay for each draft bar B consisting of a right angular bracket 10 and a horizontal curved plate 11, the bracket being attached to the under side of a draft bar B just in front of a harrow A and the plate 11 projecting under the rim of the harrow, in which position it affords support for the front edge of a harrow, thus relieving to a considerable extent strain on the pivotal connection between the harrows and the draft bars.

Two flat connecting bars 12 are pivoted to the draft bars B, B, and when it is desired to haul the harrow to or from a field, the inner ends of said bars are secured together by a screw bolt 13, as shown in Fig. 2. Thus they prevent the draft-bars B from rotating and the latter in turn hold the harrows A vertical through the medium of the stays 10, 11.

When the implement is in use, as shown in Fig. 1, the bars 12 are detached from each other, and they are supported alongside the draft-bars B by means of hooks 14. As a further means for holding the harrows duly connected and in vertical position, as in Fig. 2, I employ a hook 16 which is pivoted to an eye 17 on one of the harrows and is adapted to engage another eye 18 on the other harrow—see Fig. 2. But when the implement is to be used, the hook 16 is detached from eye 18 and hung up by an eye 19 on the spring D.

What I claim is:—

1. The improved revolving harrow formed of two circular harrows proper, draft bars to which they are separately pivoted, means for connecting the draft bars at their front ends, and a spring coupling connecting the rear ends of the same and tending to hold the peripheries of the harrows in contact, substantially as described.

2. The improved revolving harrow, comprising two circular harrows proper, draft bars having a rear swiveled section to which the harrows are pivoted, a loose draft coupling at the front ends of the draft bars, and a spring connecting the rear ends of the latter and tending to hold the peripheries of the harrows in contact, substantially as described.

3. In a revolving harrow, the combination with two circular harrows proper and a draft attachment to which they are pivoted, of a spring connecting the rear ends of the bars and tending to hold the harrows in frictional contact, substantially as described.

4. In a revolving harrow, the combination with draft bars and circular harrows pivoted thereto, of a bowed plate spring arranged vertically and its ends connected with the rear portions of the draft bars, substantially as described.

5. A revolving harrow comprising two circular harrows proper, draft-bars to which they are pivoted, a loose connection between the front portions of said draft-bars which permits their rotation on their axes, and connecting bars pivoted to said draft-bars in advance of the harrows and serving when duly connected with each other to prevent rotation of the draft-bars and thus serving to hold the harrows vertical as required for transportation, as described.

JOHN M. BASSLER.

Witnesses:
HAZEL GOMPF,
CHAS. E. GOMPF.